United States Patent
Uehara et al.

(10) Patent No.: US 6,851,876 B2
(45) Date of Patent: Feb. 8, 2005

(54) PRINTING SYSTEM, PRINTING METHOD, AND RECORDING MEDIUM

(75) Inventors: Masahiro Uehara, Kanagawa (JP); Tatsuya Kuroda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/735,915

(22) Filed: Dec. 16, 2003

(65) Prior Publication Data

US 2004/0131408 A1 Jul. 8, 2004

Related U.S. Application Data

(62) Division of application No. 10/145,891, filed on May 16, 2002.

(30) Foreign Application Priority Data

May 21, 2001 (JP) .................................... P2001-151565

(51) Int. Cl.[7] .............................................. B41J 11/44
(52) U.S. Cl. .............................. 400/76; 400/61; 400/70
(58) Field of Search ............................... 400/61, 70, 76

(56) References Cited

U.S. PATENT DOCUMENTS

| | | | | |
|---|---|---|---|---|
| 4,807,156 A | * | 2/1989 | Parisi ........................ 358/1.2 |
| 5,278,623 A | * | 1/1994 | Kasahara et al. ........... 399/394 |
| 6,031,560 A | * | 2/2000 | Wojcik et al. .............. 347/254 |
| 6,130,740 A | * | 10/2000 | DeClerck et al. ............. 355/18 |
| 6,583,852 B2 | * | 6/2003 | Baum et al. .................. 355/40 |
| 6,697,703 B2 | * | 2/2004 | Lopez ........................ 700/224 |
| 2001/0003180 A1 | * | 6/2001 | Sakai et al. ................... 705/40 |
| 2003/0063181 A1 | * | 4/2003 | Taki et al. ................... 347/212 |

* cited by examiner

Primary Examiner—Charles H. Nolan, Jr.
(74) Attorney, Agent, or Firm—Rader, Fishman & Grauer PLLC; Ronald P. Kananen

(57) ABSTRACT

A printing system, a printing method and a recording medium are capable of conducting printing efficiently. Regarding the first printing means for printing images per one print in the first size and discharging these images, and the second printing means for printing images per multiple copies in the first size and discharging these images, the number of prints to be allocated to the first and second printing means is determined so that printing is finished in a minimum amount of time corresponding to the total number of prints of the first size to be printed. And, based on the determination result, the first and the second printing means are controlled.

2 Claims, 20 Drawing Sheets

| NUMBER OF PRINTS | LL | L, 2L |
|---|---|---|
| 1 | 20 | 20 |
| 2 | 20 | 32 |
| 3 | 40 | 32 |
| 4 | 40 | 40 |
| 5 | 60 | 60 |
| 6 | 60 | 64 |
| 7 | 80 | 64 |
| 8 | 80 | 80 |
| 9 | 100 | 100 |
| 10 | 100 | 96 |
| 11 | 120 | 100 |
| 12 | 120 | 120 |
| 13 | 140 | 128 |
| 14 | 140 | 128 |
| 15 | 160 | 140 |
| 16 | 160 | 160 |
| 17 | 180 | 160 |
| 18 | 180 | 160 |
| 19 | 200 | 180 |
| 20 | 200 | 192 |
| 21 | 220 | 192 |
| 22 | 220 | 200 |
| 23 | 240 | 220 |
| 24 | 240 | 224 |
| 25 | 260 | 224 |
| 26 | 260 | 240 |
| 27 | 280 | 260 |
| 28 | 280 | 256 |
| 29 | 300 | 260 |
| 30 | 300 | 260 |
| 31 | 320 | 288 |
| 32 | 320 | 288 |
| 33 | 340 | 300 |
| 34 | 340 | 320 |
| 35 | 360 | 320 |
| 36 | 360 | 320 |
| 37 | 380 | 340 |
| 38 | 380 | 352 |
| 39 | 400 | 352 |
| 40 | 400 | 360 |
| 41 | 420 | 380 |
| 42 | 420 | 384 |
| 43 | 440 | 384 |
| 44 | 440 | 400 |
| 45 | 460 | 420 |
| 46 | 460 | 416 |
| 47 | 480 | 420 |
| 48 | 480 | 440 |
| 49 | 500 | 448 |
| 50 | 500 | 448 |

FIG. 18

| NUMBER OF PRINTS | L, L, L | L, L, 2L | L, 2L, 2L |
|---|---|---|---|
| 1 | 20 | 20 | 20 |
| 2 | 20 | 32 | 32 |
| 3 | 20 | 32 | 32 |
| 4 | 40 | 32 | 40 |
| 5 | 40 | 40 | 32 |
| 6 | 40 | 64 | 40 |
| 7 | 60 | 60 | 60 |
| 8 | 60 | 64 | 64 |
| 9 | 60 | 64 | 64 |
| 10 | 80 | 64 | 64 |
| 11 | 80 | 80 | 64 |
| 12 | 80 | 96 | 80 |
| 13 | 100 | 100 | 96 |
| 14 | 100 | 96 | 96 |
| 15 | 100 | 100 | 100 |
| 16 | 120 | 128 | 96 |
| 17 | 120 | 120 | 100 |
| 18 | 120 | 128 | 120 |
| 19 | 140 | 128 | 128 |
| 20 | 140 | 128 | 128 |
| 21 | 140 | 140 | 140 |
| 22 | 160 | 160 | 128 |
| 23 | 160 | 160 | 140 |
| 24 | 160 | 160 | 160 |
| 25 | 180 | 160 | 160 |
| 26 | 180 | 160 | 160 |
| 27 | 180 | 180 | 160 |
| 28 | 200 | 192 | 160 |
| 29 | 200 | 192 | 180 |
| 30 | 200 | 192 | 192 |
| 31 | 220 | 200 | 192 |
| 32 | 220 | 224 | 200 |
| 33 | 220 | 220 | 192 |
| 34 | 240 | 224 | 200 |
| 35 | 240 | 224 | 220 |
| 36 | 240 | 224 | 224 |
| 37 | 260 | 240 | 224 |
| 38 | 260 | 256 | 224 |
| 39 | 260 | 260 | 224 |
| 40 | 280 | 256 | 240 |
| 41 | 280 | 260 | 256 |
| 42 | 280 | 288 | 256 |
| 43 | 300 | 280 | 260 |
| 44 | 300 | 288 | 256 |
| 45 | 300 | 288 | 260 |
| 46 | 320 | 288 | 280 |
| 47 | 320 | 300 | 288 |
| 48 | 320 | 320 | 288 |
| 49 | 340 | 320 | 300 |
| 50 | 340 | 320 | 288 |

FIG.20

PRINTING SYSTEM, PRINTING METHOD, AND RECORDING MEDIUM

RELATED APPLICATION

This Application is a Divisional application of Ser. No. 10/145,891 filed May 16, 2002.

BACKGROUND OF THE INVENTION

1. Field of the Invention

The present invention relates to a printing system, a printing method and a recording medium, which are suitably applied to a printing system comprising multiple sets of sublimate, color roll printers, for example.

2. Description of the Related Art

In a sublimate color printer, a thermal head is pressed onto the platen via an ink ribbon and print paper, and by heat transferring the heat molten or sublimate ink applied to the ink ribbon on the print paper per one line using the thermal head based on a print signal to be given from outside, images based on the print signal can be printed on the print paper.

In the case of printing a large quantity of images, by using a plural number of sublimate color printers and operating these concurrently, images can be printed in a minimum amount of time.

At this point, the time required to finish printing all images to be printed is as follows:

$$t = \frac{n}{p} \quad (1)$$

Where the total number of prints is n; the number of sublimate color printers is p; the time required for the sublimate color printer to print a copy of an image is t; and, the time can not be shorter than t.

On the other hand, as the digital camera comes into wide use, digital printing service is offered widely; and, a printing system capable of printing a vast number of images more rapidly is desired in printing shops that offer printing service.

SUMMARY OF THE INVENTION

In view of the foregoing, an object of this invention is to provide a printing system, and a printing method, and a recording medium capable of conducting printings efficiently.

The nature, principle and utility of the invention will become more apparent from the following detailed description when it is read in conjunction with the accompanying drawings in which like parts are designated by like reference numerals or characters.

BRIEF DESCRIPTION OF THE DRAWINGS

In the accompanying drawings:

FIG. 18 is a diagram showing the total print time according to various configurations;

FIG. 20 is a diagram showing another embodiment.

DETAILED DESCRIPTION OF THE EMBODIMENT

Figure 1:
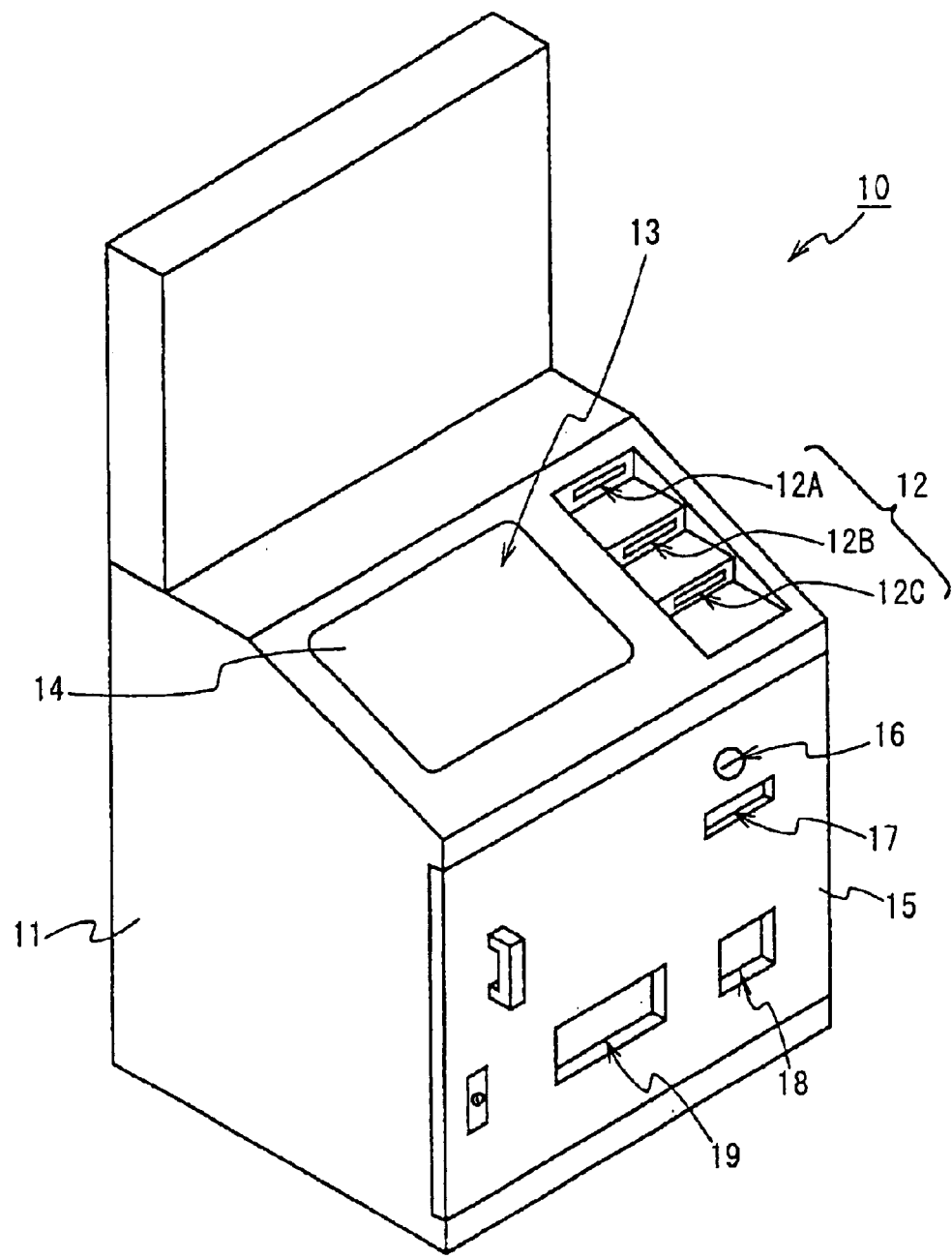
FIG. 1 is a brief, linear perspective view showing the external construction of a printing service device according to the present invention.

Preferred embodiments of this invention will be described with reference to the accompanying drawings:

(1) Construction of Printing Service Device 10 According to the Present Invention In FIG. 1, reference numeral 10 generally shows a printing service device to be placed on the street and in convenience stores according to the embodiment of the present invention; and, the service to print images recorded on various types of removable media, such as a memory card, a floppy disk and a recordable compact disc (CD=R), in the user desired size by the number of prints that the user desires can be offered for pay.

More specifically, in this printing service device 10, a plural number of slots 12 (12A, 12B, 12C) corresponding respectively to various removable media placed on the front surface part of a box 11, a monitor 14 on which a touch panel 13 is attached to its display screen and an open-close free door 15 are provided. Also, a coin inserting slot 16, a money inserting slot 17, a coin return slot 18 and a paper discharging slot 19 are provided on the door 15.

Figure 2:
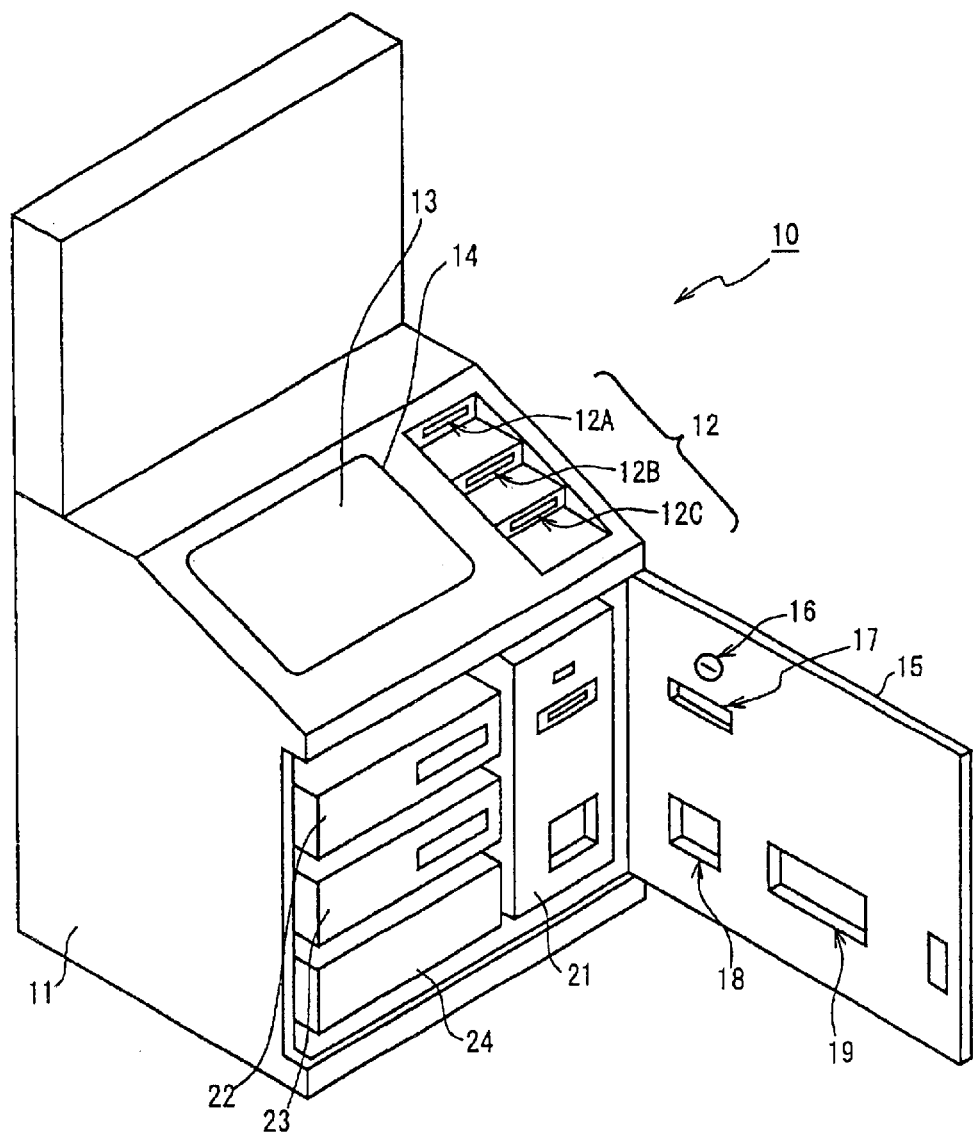
FIG. 2 is a brief, linear perspective view illustrating the internal construction of a printing service device.
Figure 3:
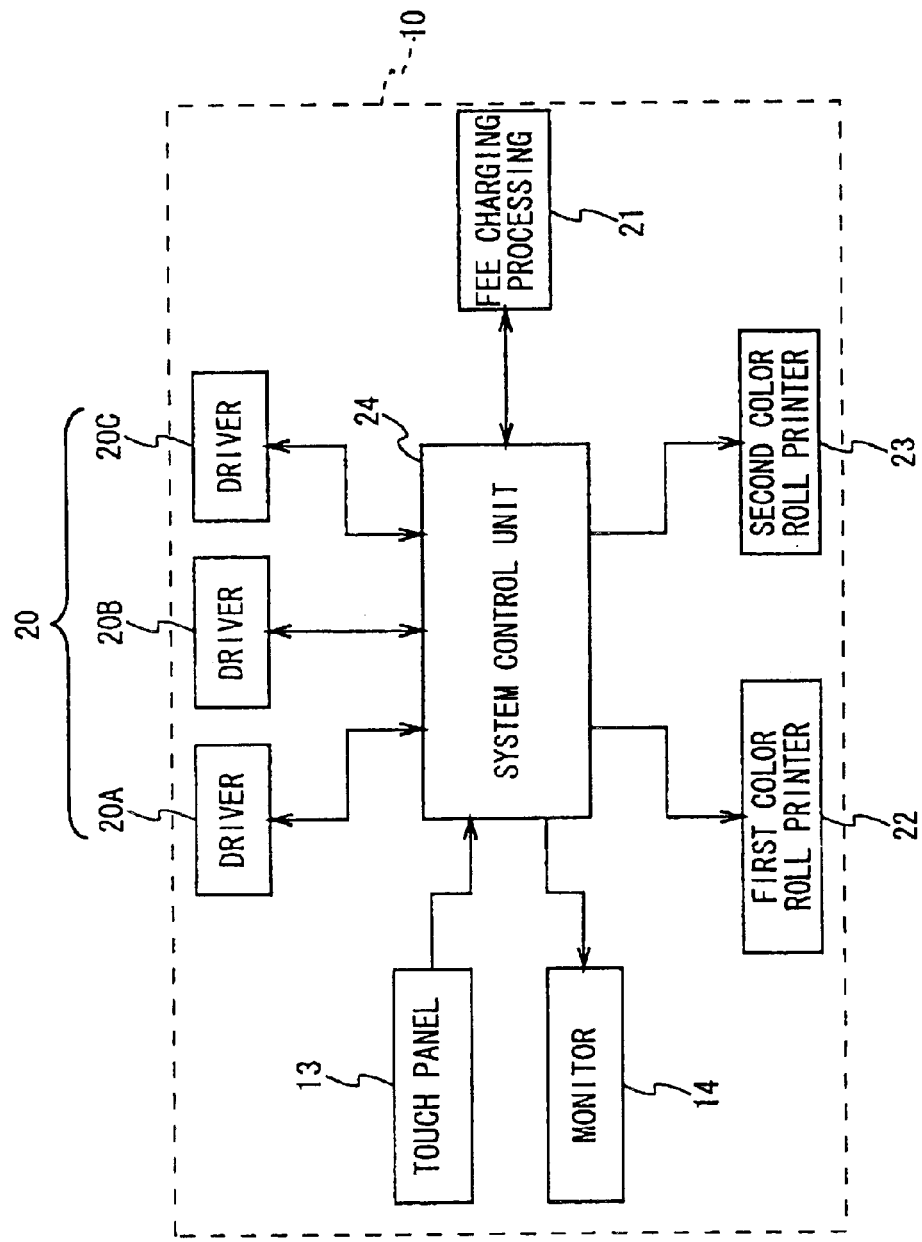
FIG. 3 is a block diagram illustrating the internal construction of a printing service device.

Furthermore, as shown in FIGS. 2 and 3, inside of the box 11, various removable media drivers 20 (20A, 20B, 20C) placed corresponding to each slot 12 respectively, a fee charging processing unit 21 for conducting various kinds of processing on fee charging, sublimate type first and second color roll printers 22 and 23, and a system control unit 24 for conducting the operation control of this printing service device 10 are stored.

Figures 4A, 4B:
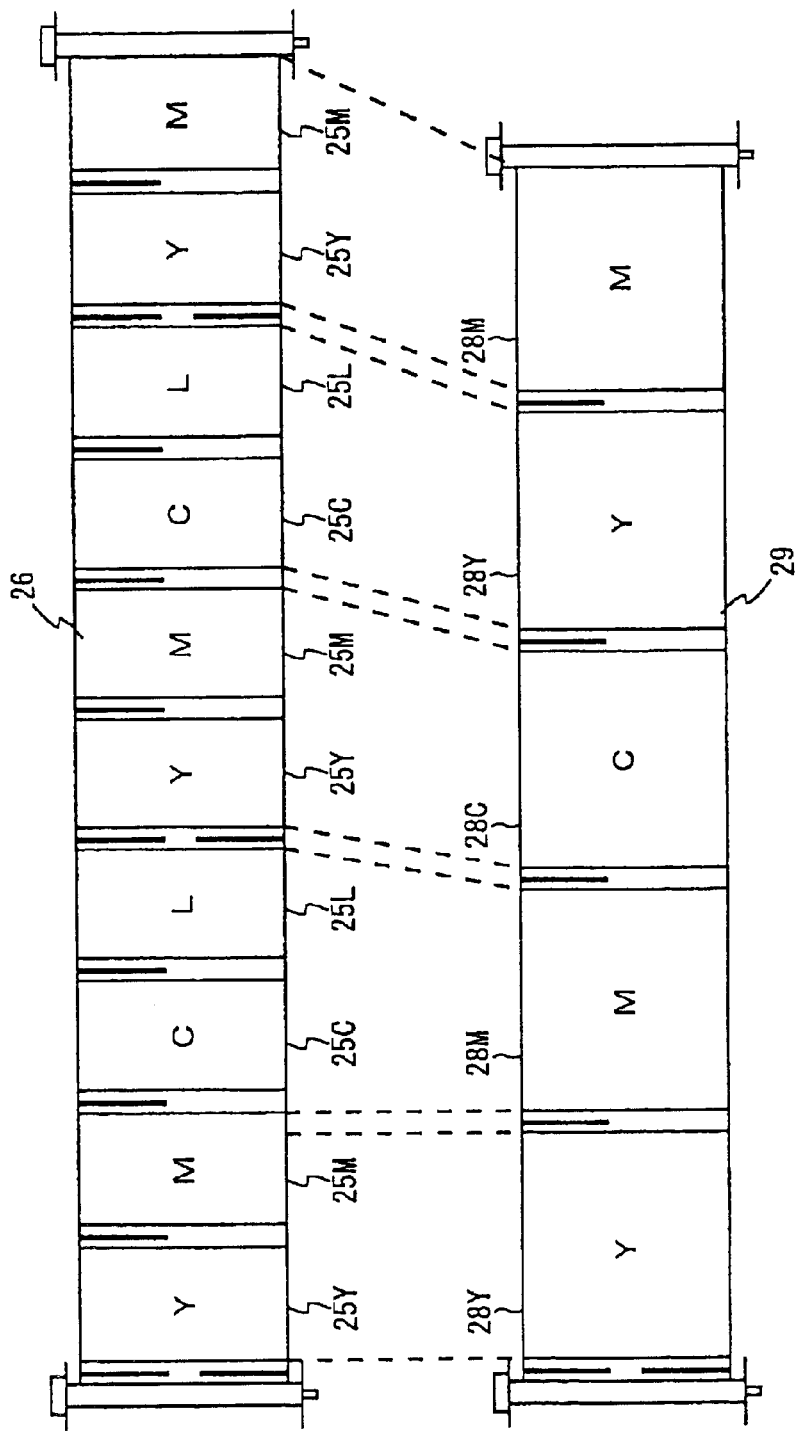
FIGS. 4A and 4B are brief, linear plane diagrams illustrating an L-size ink ribbon and an 2L-size ink ribbon.
Figure 5A:
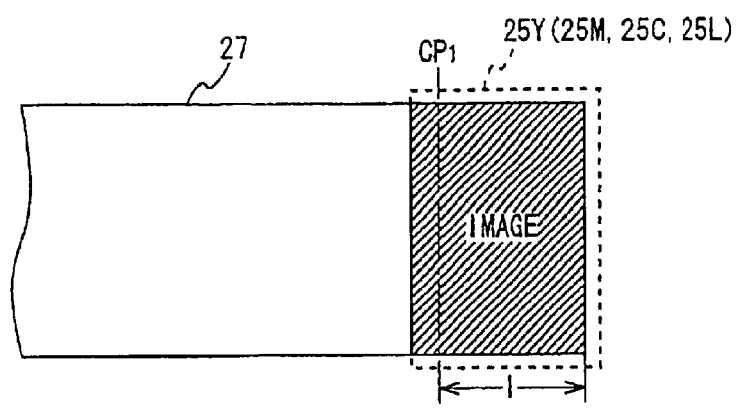
FIGS. 5A and 5B are conceptual diagrams illustrating printing onto roll paper.
Figure 5B:
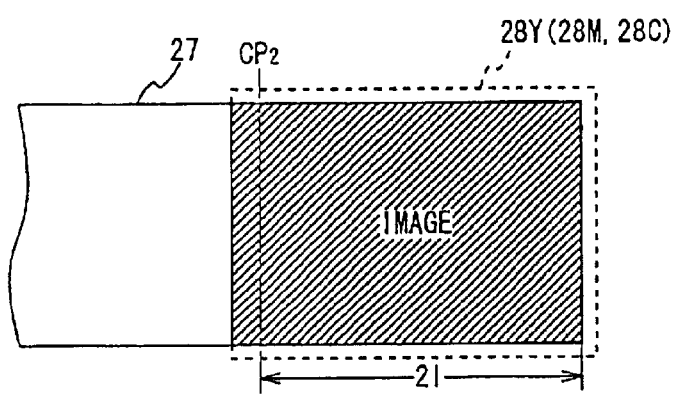

In this case, as shown in FIG. 4A, the color roll printer 23 is equipped with an ink ribbon 26 on which yellow (Y), magenta (M) and cyan (C) inks and a laminating sheet (L), each having a size corresponding to the normal printing size (hereinafter referred to as the L size) are applied or attached in order repeatedly, having space between them, and a roll paper 27 having the same width as the length of the L size, as shown in FIGS. 5A and 5B.

Then, the first color roll printer 22, sequentially conducting the thermal transfer of each color ink 15Y, 15M and 15C of the ink ribbon 26 for the L size and the laminating sheet 25L onto the roll paper 27 based on the image data supplied from the system control unit 24, that will be described later, prints images based on that image data on the edge part of the roll paper 27, as shown in FIG. 5A. Then, cutting off the edge part of the roll paper 27 at a predetermined cutting position $CP_1$, the first color roll printer 22 can output L-size print images per one print.

Furthermore, the second color roll printer 23 is equipped with an ink ribbon 29 (hereinafter referred to as an ink ribbon for the 2L-size) on which inks 28Y, 28M, 28C of yellow (Y), magenta (M) and cyan (C), respectively, are applied in order repeatedly, having space between corresponding to the 2L-size, its width being twice as big as the L-size, as shown in FIG. 4B, and the same roll paper 27 as that provided on the first color roll printer 22.

Furthermore, the second color roll printer 3, successively conducting the thermal transfer of inks 28Y, 28M, 28C of ink ribbon for the 2L-size, prints an image based on that image data onto the edge part of the roll paper 27, as shown in FIG. 5B. Then, cutting off the edge part of the roll paper 27 at a cutting position $CP_2$, it can output a 2L-size printed image per one print.

On the other hand, the system control unit 24 is comprised of a personal computer configuration having a central processing unit (CPU), a read only memory (ROM), a random access memory (RAM) and a hard disc device. This system control unit 24 sequentially displays the required graphical user interface (GUI) screen on the monitor 14 based on the control program stored in the ROM or hard disc device in advance; and, simultaneously, it controls the corresponding driver 20 and the first and/or the second color roll printers 22, 23 based on the user input given via the control program and the touch panel 13.

Figure 6:
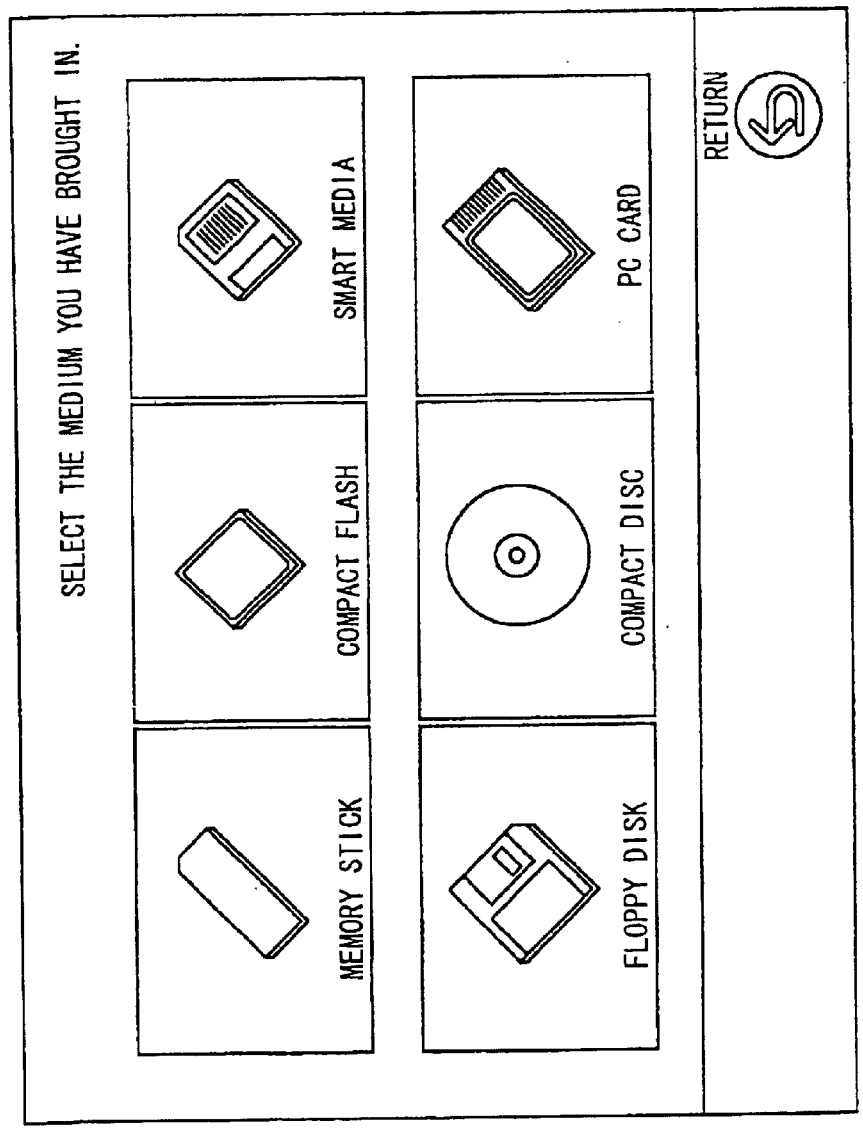
FIG. 6 is a brief linear diagram showing a media selection screen.
Figure 7:
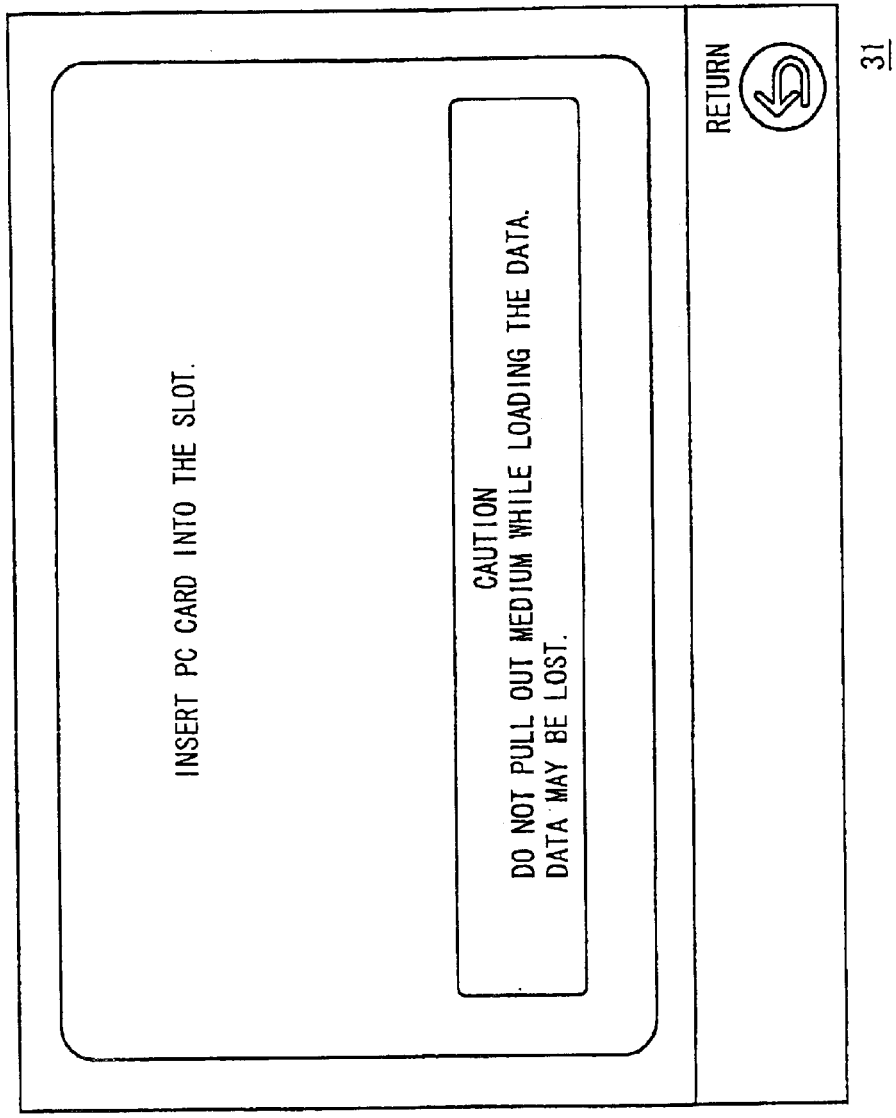
FIG. 7 is a brief linear diagram showing a message screen.

In practice, the system control unit 24, by displaying the media selection screen 30, as shown in FIG. 6, on the monitor 14, makes the user select removable media brought in by the user; and, then, by displaying the message screen 31, as shown in FIG. 7, on the monitor 14, the system control unit 24 urges the user to insert that removable media into the corresponding slot 12.

Figure 8:
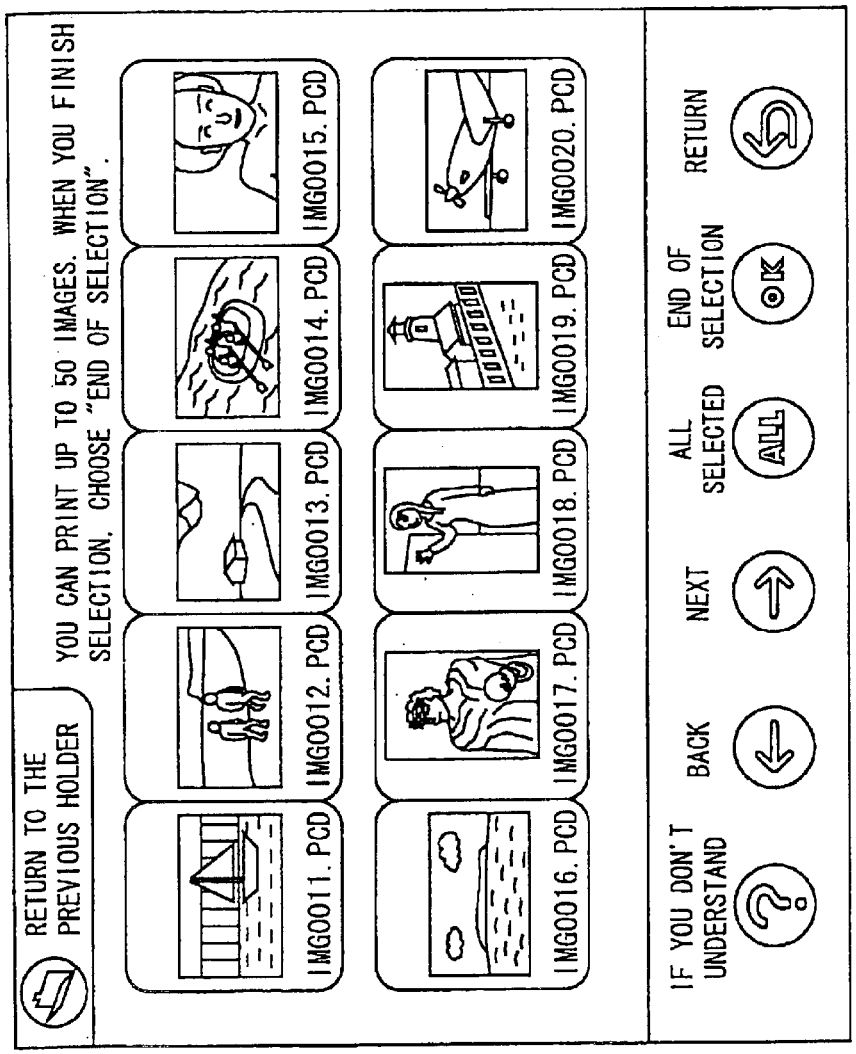
FIG. 8 is a brief linear diagram showing a print selection screen.

Moreover, when the removable media is loaded on the corresponding driver 20 via the slot 12 to which the removable media corresponds, the system control unit 24 reads out all image data recorded on the removable media, and the thumbnail picture of each image based on the image data read out is displayed on the monitor 14, such as those shown in FIG. 8, as the print selection screen 32.

Figure 9:
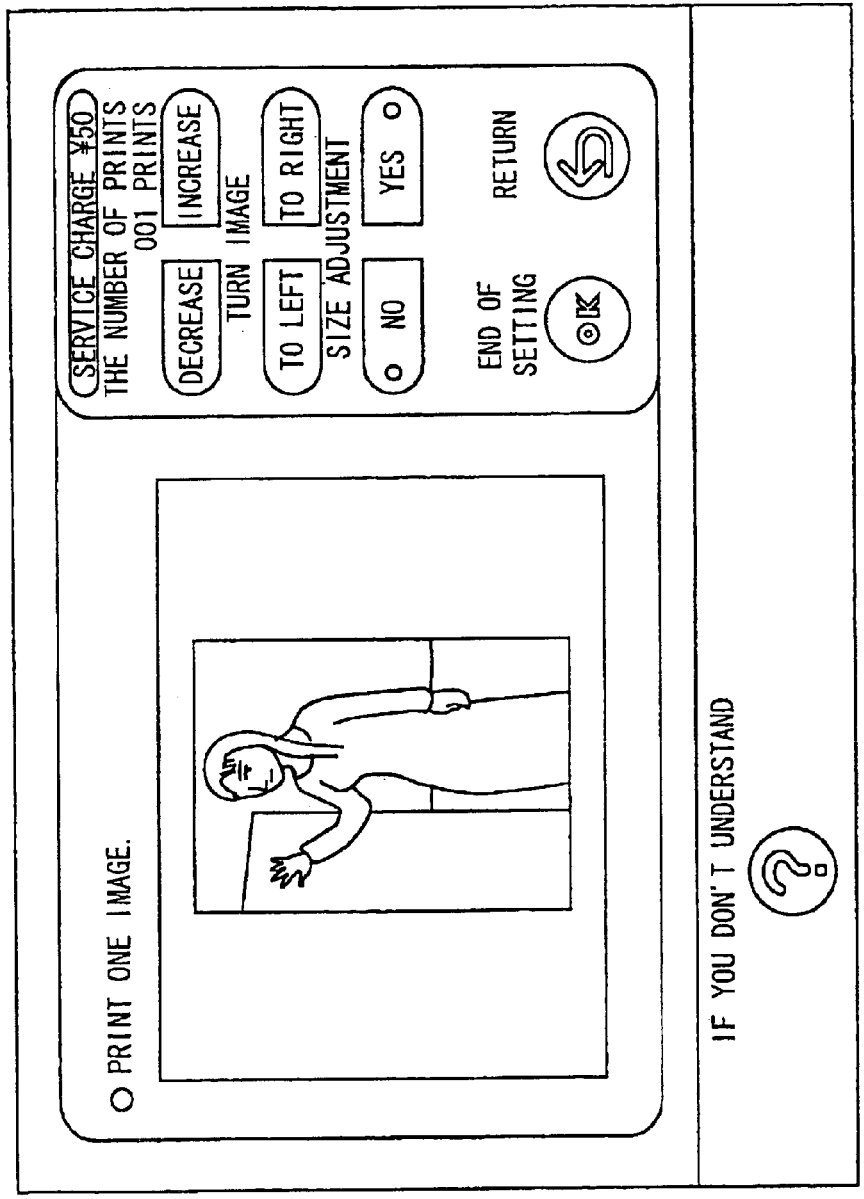
FIG. 9 is a brief linear diagram showing a print setting screen.

Furthermore, when the corresponding part of touch panel 13 is pressed and one image in the print selection screen 32 is selected, the system control unit 24 displays the print setting screen 33 for setting the desired number of prints, the printing direction and the print size (L size or 2L size) for images as shown in FIG. 9 on the monitor 14. Accordingly, by using the print selection screen 32 and the print setting screen 32, the user can select one or multiple desired images and can set the desired number of prints of these images.

With this arrangement, when the selection of images and the setting of the desired number of prints are all finished, the system control unit 24 confirms that the corresponding amount of money has been thrown in based on the input money information supplied from the fee-charging processing unit 21 informing the amount put in by the user; and, applying the predetermined signal processing onto the image data of each image selected (hereinafter referred to as selected image), it gives such image data per each selected image to the first and/or the second color roll printer 22, 23 with the print command.

As a result, only the number of prints of each image set based on this image data is printed by the first and/or the second color roll printer 22, 23. And this print result is put out through the paper discharging slots of the first and/or the second color roll printers 22, 23, a shooter (not shown in FIG.) placed inside of the door 15 (FIG. 2) of the printing service device 10 and a paper discharging slot 19 provided on the door 15.

With this arrangement, in this printing service device 10, the user can print images based on the image data stored in various removable media in the desired print size and the desired number of prints by his own operation.

(2) Construction of the First and Second Color Printers 22, 23

Figure 10:
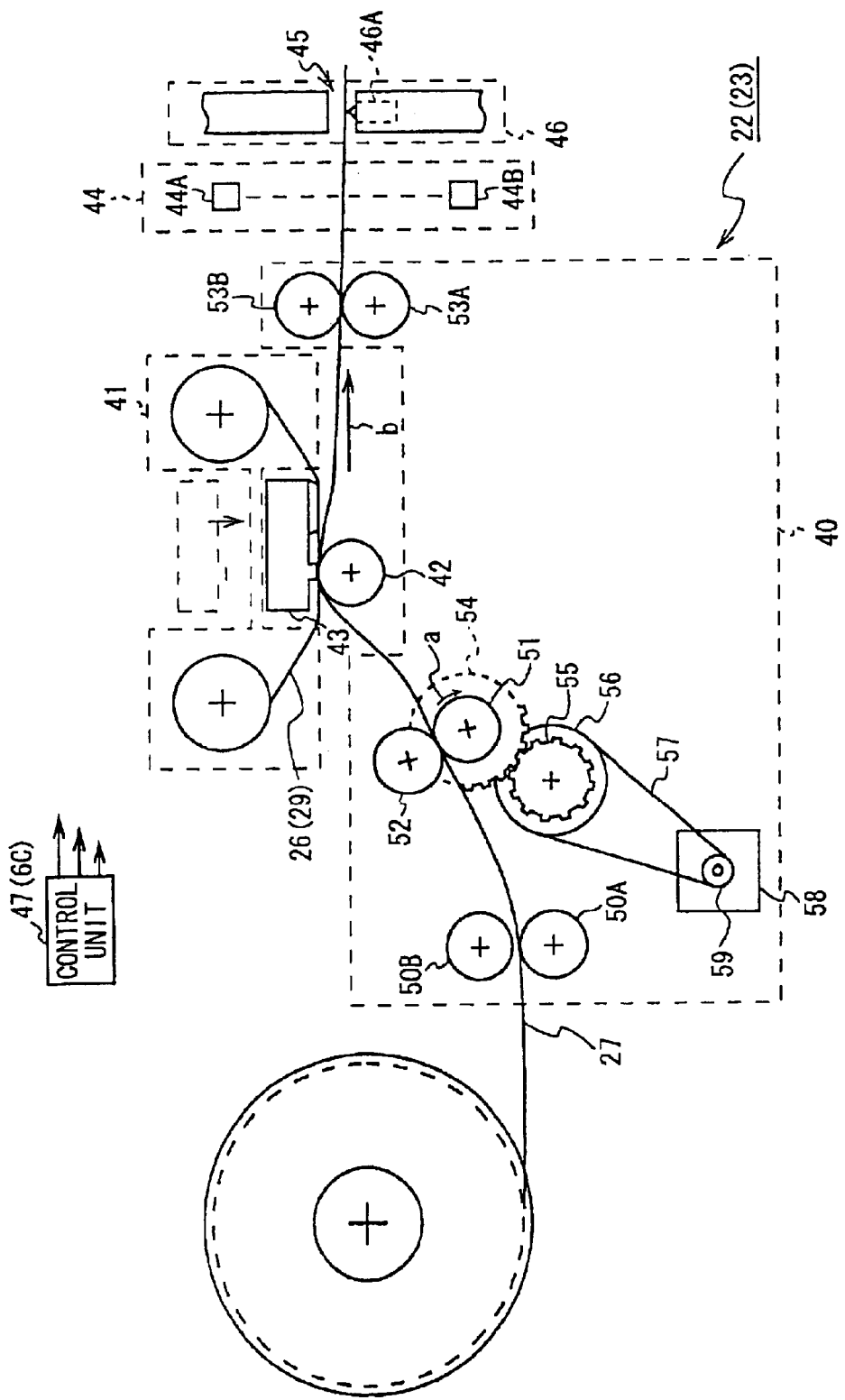
FIG. 10 is a brief linear diagram showing the construction of the first and the second color roll printers.

At this point, FIG. 10 shows the internal construction of the first color roll printer 22 of the printing service device 10.

As is apparent from FIG. 10, the first color roll printer 22 is equipped with a roll paper carrier unit 40, a ribbon take-up unit 41 for holding the ink ribbon 26 for the L-size with fixed tension and for rotating the take-up reel to take up the ink ribbon 26 for a L-size, a platen 42, a line type thermal head 43, a sensor unit 44 for detecting the existence or non-existence of the roll paper 27, a roll paper cutting unit 46 placed on the paper discharging slot 45 in the first color printer 22, and a control unit 47 to control the whole operation of the first color roll printer 22.

The roll paper carrier unit 40 is equipped with a pair of first carrier rollers 50A and 50B, a capstan roller 51, a pressure roller 52 and a pair of second carrier rollers 53A and 53B that are placed rotation free along the carrier path of the roll paper 27 respectively. One of the first carrier rollers 50B, the pressure roller 52 and one of the second carrier rollers 53B can move freely by the driving mechanism (not shown in FIG.) either in the direction to touch to the corresponding other first carrier roller 50A, the capstan roller 51, or the other second carrier roller 52A or in the direction to depart from these.

Furthermore, the capstan roller 51 is connected to the timing pulley 59 fixed to the output axis of the pulse motor 58 sequentially through a gear 54 placed coaxial and integral with the capstan roller 51, a gear 55 for gearing with the gear 54, a timing pulley 56 formed integral with the gear 55 and a timing belt 57. Thus, by driving the pulse motor 58, the capstan roller 51 can be rotated in the direction of the arrow a or in the opposite direction.

With this arrangement, in the roll paper carrier unit 40, under the condition in which one of the first carrier rollers 50B, the pressure roller 52 and one of the second carrier rollers 53B are attached respectively to the corresponding first carrier roller 50A of the other side, the capstan motor 51, or the second carrier roller 52A of the other side, by driving the pulse motor 58 and rotation driving the capstan roller 51, the roll paper 27 can run in the direction of discharging the paper (the arrow mark b) along the carrier path or in the opposite direction.

Furthermore, the platen 42 is placed in a later stage than the capstan roller 51 on the carrier path of the roll paper 7; and, the thermal head 43 is held by the head holding unit (not shown in figures) in order to face to the platen 42 via the carrier path of the roll paper 27.

The head holding unit is capable of moving the thermal head 43 freely in the direction in which the thermal head 43 attaches to the platen 42 and in the opposite direction. Thus, the thermal head 43 can be attached to the platen 42 as the occasion demands.

Furthermore, the sensor unit 44 comprises a pair of a light emitting element 44A and a radiation element 44B placed on both sides having the carrier path of the roll paper 27 between and placed in the vicinity of a paper discharging slot 45 of the first color roll printer 22, that is, the last stage of the carrier path of the roll paper 27. With this arrangement, based on the output of this sensor unit 44 (i.e., the output of the light emitting element 44B), the control unit 47 can detect the existence or non-existence of the roll paper 27 on that position.

Furthermore, the roll paper cutting unit 46 comprises a cutter blade 46A placed freely sliding along the paper discharging slot 45; and by sliding the cutter blade 46A, the roll paper 27 can be cut in the width direction.

The control unit 47 is comprised of micro-computer configuration having, for example, a CPU, ROM and RAM; and, it executes the necessary control processing and signal processing based on a command given from the system control unit 24 (FIG. 3).

Figure 11:
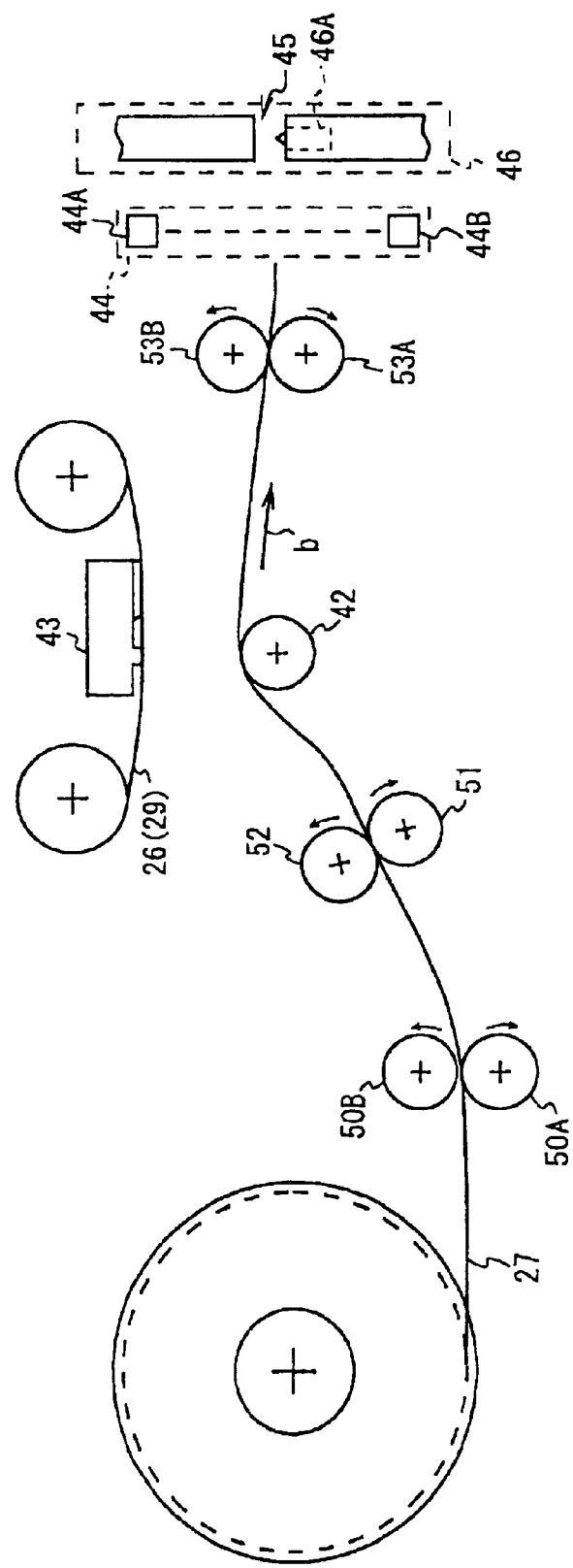
FIG. 11 is a brief linear diagram illustrating the starting location of the roll paper in the first and the second color roll printers.
Figure 12:
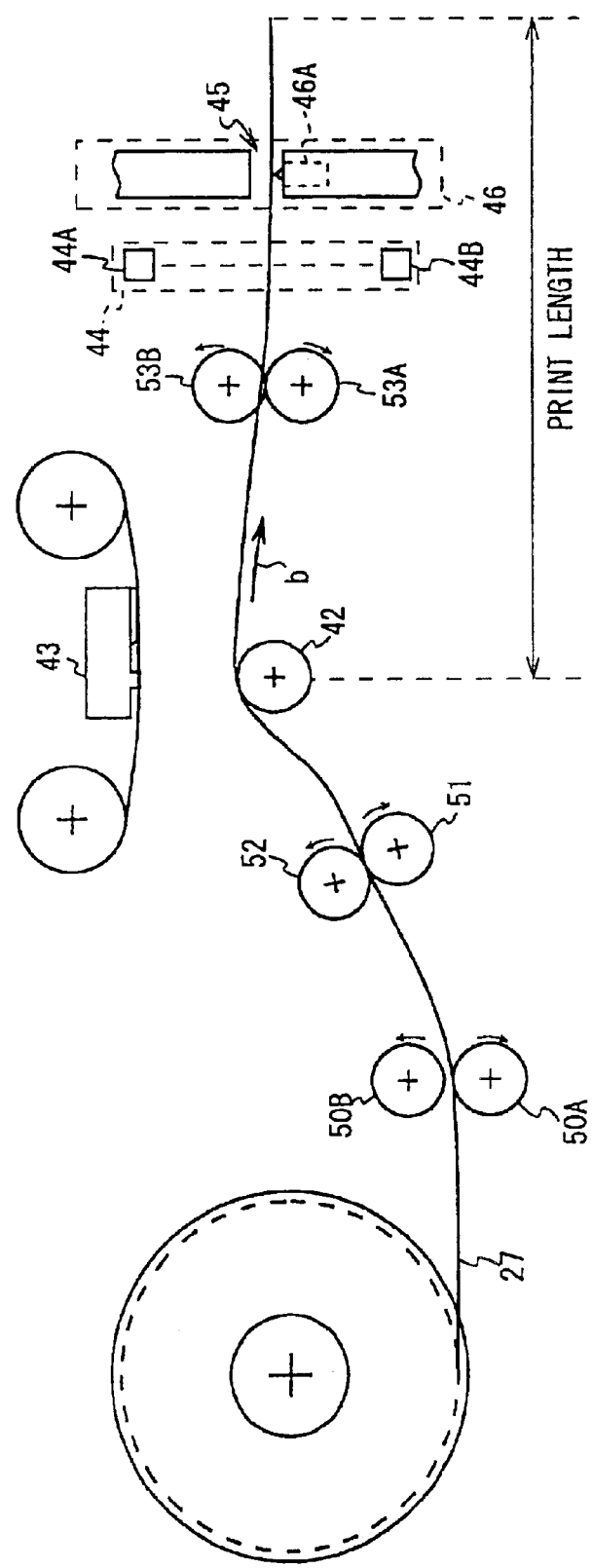
FIG. 12 is a brief linear diagram illustrating the starting location of the roll paper in the first and the second color roll printers.

In practice, when the print command is given with image data from the system control unit 24, the control unit 47 sends the roll paper 27 in the paper discharging direction by driving the roll paper carrier unit 40 as shown in FIG. 11. In this case, by confirming the edge position of the roll paper 27 based on the output of the sensor unit 44, as shown in FIG. 12, the control unit 47 locates the beginning position of the roll paper 27 so that the length from the tip part of the roll paper 27 to the print starting position becomes the print length for the L-size.

Furthermore, by driving the ribbon take-up unit 41 (FIG. 10), the control unit 47 locates the beginning of the yellow ink 25Y (FIG. 4A) applied to the ink ribbon 26 for the L-size. Then, at the time when locating the beginning of the roll paper 27 and the ink ribbon for L-size 26 is finished, the control unit 47 attaches the thermal head 43 to the platen 42 via the ink ribbon 26 for the L-size and the roll paper 27 by driving the head holding unit.

Figure 13:
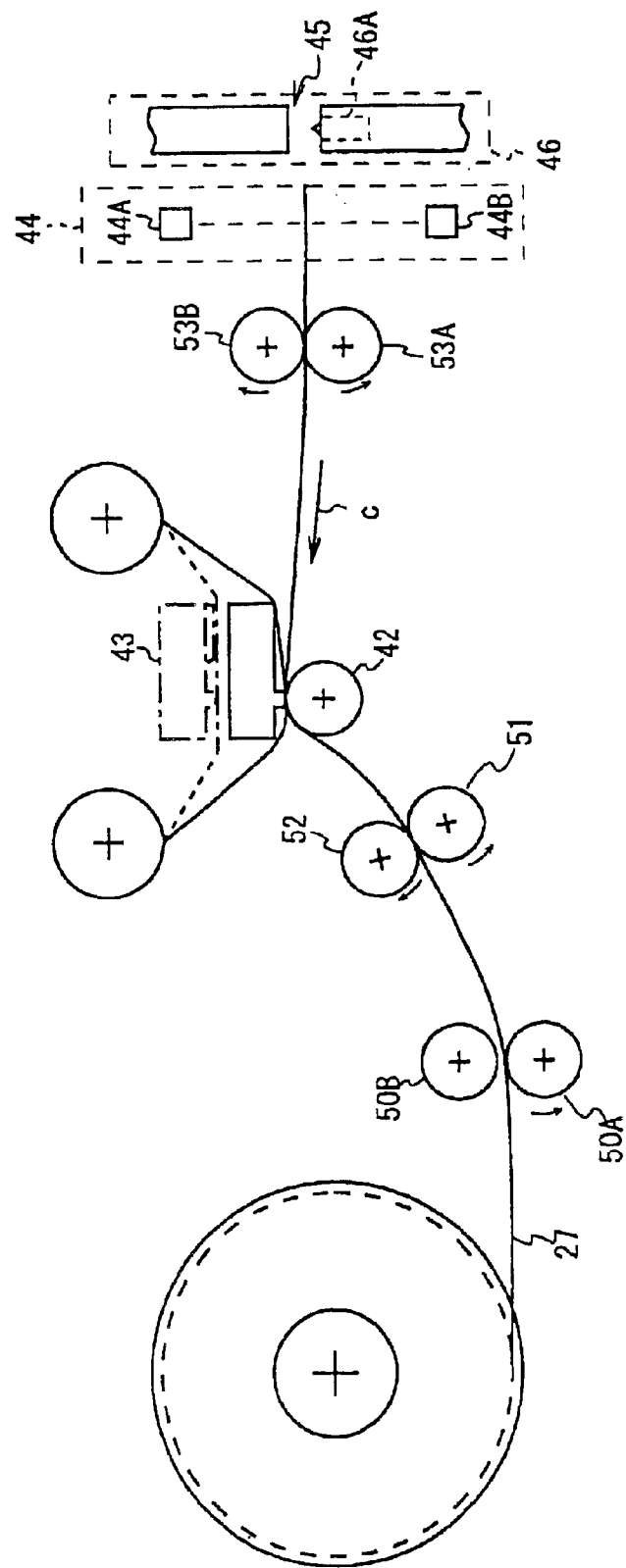
FIG. 13 is a brief linear diagram illustrating the printing operation in the first and the second color roll printers.

Then, the control unit 47, applying predetermined signal processing, such as the gamma correction, to the image data given from the system control unit 24, as shown in FIG. 13, supplies its yellow element to the thermal head 43 per one line. At the same time, the control unit 47 drives the pulse motor 58 (FIG. 10) of the roll paper carrier unit 40 (FIG. 10), and by successively pulling back the roll paper 27 per one line in the opposite direction to the paper discharging direction, it prints the yellow element of the color images based on the image data on the roll paper 27 one line by one line.

Similarly, the control unit 47, successively thermal transferring magenta (M) and cyan (C) inks 25M and 25C of the ink ribbon 26 for the L-size and the laminating sheet 25L to the roll paper 27, prints color images for the L-size based on the image data on the tip part of the roll paper 27.

Then, when the control unit 47 terminates such color image printing, it sends the roll paper 27 in the paper discharging direction by controlling the roll paper carrier unit 40 (FIG. 10). And then, by controlling the roll paper carrier unit 40 and the roll paper cutting unit 46, it has the tip part of the roll paper on which such color image is printed cut off. As a result, this color image is discharged outside via the paper discharging slot 19 (FIG. 1) of the printing service device 10, as described above.

Furthermore, by controlling the roll paper carrier unit 40 and the roll paper cutting unit 46, the control unit 47 has the part on which the color image remains in the edge part of the roll paper 27 cut off, and then it terminates the printing processing to this image.

Thus, the first color roll printer 22 can print color images for the L-size based on the image data supplied from the system control unit 24 per one print and discharge these.

On the other hand, the second color roll printer 23 is constructed similarly to the first color roll printer 22, except the contents of the control processing of the control unit 60 (FIG. 10) at the time of print mode are different.

In practice, when the print command is given from the system control unit 24 with the image data, the control unit 60 of the second color roll printer 23, by driving the roll paper carrier unit 40, makes it locate the beginning of the roll paper 27 in the same manner as in the case of the first color roll printer 22.

Moreover, the control unit 60 successively and thermally transfers each ink 28Y, 28M, 28C of yellow (Y), magenta (M) and cyan (C) of ink ribbon 29 for the 2L-size in a manner similar to those of the first color roll printer 22 and prints a 2L-size color image based on the image data on the tip part of the roll paper 27.

Furthermore, when the control unit 60 terminates such color image printing, by controlling the roll paper carrier unit 40, it sends the roll paper 27 in the discharging direction. And then, by controlling the roll paper carrier unit 40 and the roll paper cutting unit 46, it cuts off the tip part of the roll paper 27 on which color image is printed. As a result, this color image is put out via the paper discharging slot 19 (FIG. 1) of the printing service device 10, as described above.

Furthermore, the control unit 60, by controlling the roll paper carrier unit 40 and the roll paper cutting unit 46, cuts off the part on which the color image remains in the tip part of the roll paper 27. And then, it terminates the printing processing for this image.

Accordingly, the second color roll printer 23 can print 2L-size color images based on the image data supplied from the system control unit 24 per one print and discharge them by one.

Figure 14:
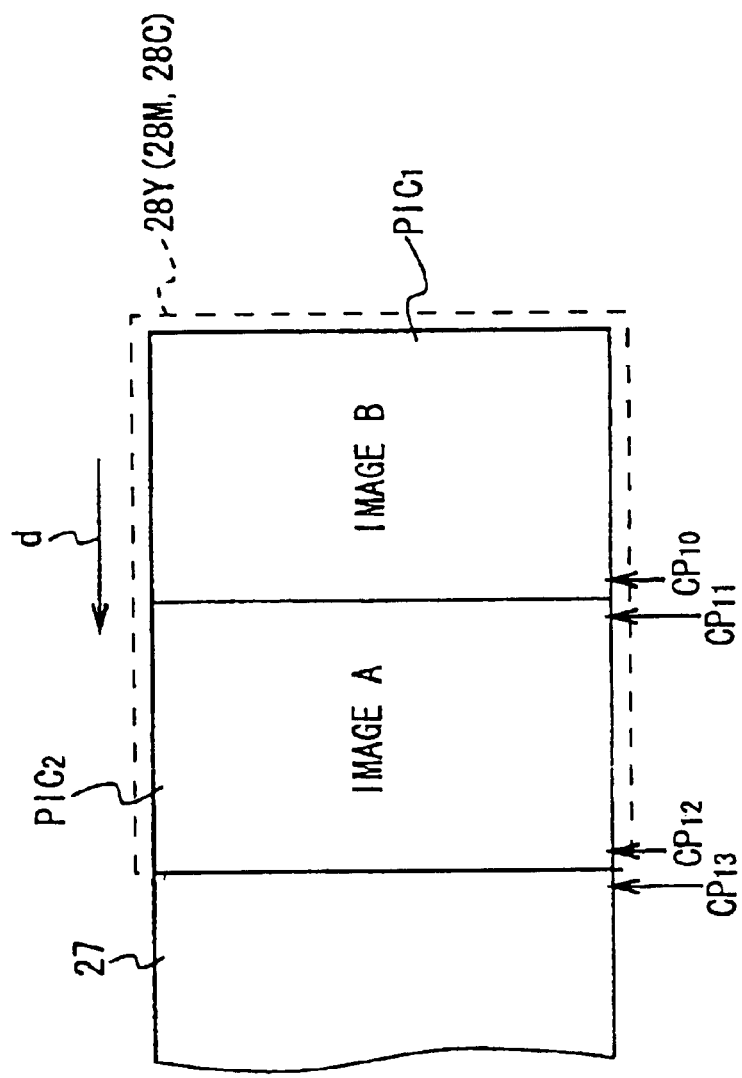
FIG. 14 is a conceptual diagram illustrating the second print mode.

In addition to the construction described above, in the case of the printing service device 10, other than the first print mode that prints one 2L-size color image a second print mode having the feature of being capable of printing L-size color images for 2 images continuously is provided in the second color roll printer 23, as shown in FIG. 14. And, these first and second print modes can be shifted freely under the control of the system control unit 24.

In practice, at the time of the second print mode when the image data for 2 images (when printing 2 copies of the same image, image data for one image) and its print command are given from the system control unit 24, the control unit 60 of the second color roll printer 23 continuously prints color images for the 2L-size, i.e., $PIC_1$ and $PIC_2$, onto the tip part of the roll paper 27 vertically.

Furthermore, by controlling the roll paper carrier unit 40 and the roll paper cutting unit 46, respectively, the control unit 60 successively cuts off the roll paper 27 at the first cutting position $CP_{10}$ set in the vicinity of the edge part in the arrow d direction of the color image $PIC_1$ printed on the tip side of the roll paper, the second cutting position $CP_{11}$ set in the vicinity of the edge part in the opposite direction to the arrow mark d in the other side color image $PIC_2$, and the third cutting position $CP_{12}$ set in the vicinity of the edge part of the arrow mark d in the other side color image $PIC_2$. As a result, these color images PIC$_1$ and PIC$_2$ printed on the roll paper 27 are cut out and separated at the printed part and successively carried out via the paper discharging slot 19 (FIG. 1) of the printing service device 10.

Furthermore, the control unit 60, by again controlling the roll paper carrier unit 40 and the roll paper cutting unit 46, cuts off the roll paper 27 at the predetermined, fourth cutting position CP$_{13}$, slightly departed in the arrow d direction from the edge part of the color image of the other side PIC$_2$ remaining in the tip part of the roll paper 27. Then, the control unit 60 terminates the printing processing to these 2 color images PIC$_1$ and PIC$_2$.

According to the method for obtaining 2 copies of L-size color images after printing 2 pictures continuously and cutting off these, 2 prints of L-size print images can be obtained in a short period of time as compared with the case of using the first color roll printer 22.

Thus, the second color roll printer 23 can print L-size images per 2 prints more rapidly by using the ink ribbon for the 2L-size.

(3) Control Processing of System Control Unit 24 under Print Processing

Next, the control processing of the system control unit 24 when conducting printing processing will be described in the following paragraphs.

The printing service device 10 is so constructed that the second color roll printer 23 can print L-size print per 2 prints. Thus, in utilizing this feature, the system control unit 23 can determine the number of prints to allocate to the first and the second color roll printers 22, 23, respectively, so that printing is ended in a minimum amount of time corresponding to the total number of prints (hereinafter referred to as merely the desired number of prints) of the user desired L-size image. And, based on the determination result, it controls these first and the second color roll printers 22 and 23.

Figure 15:
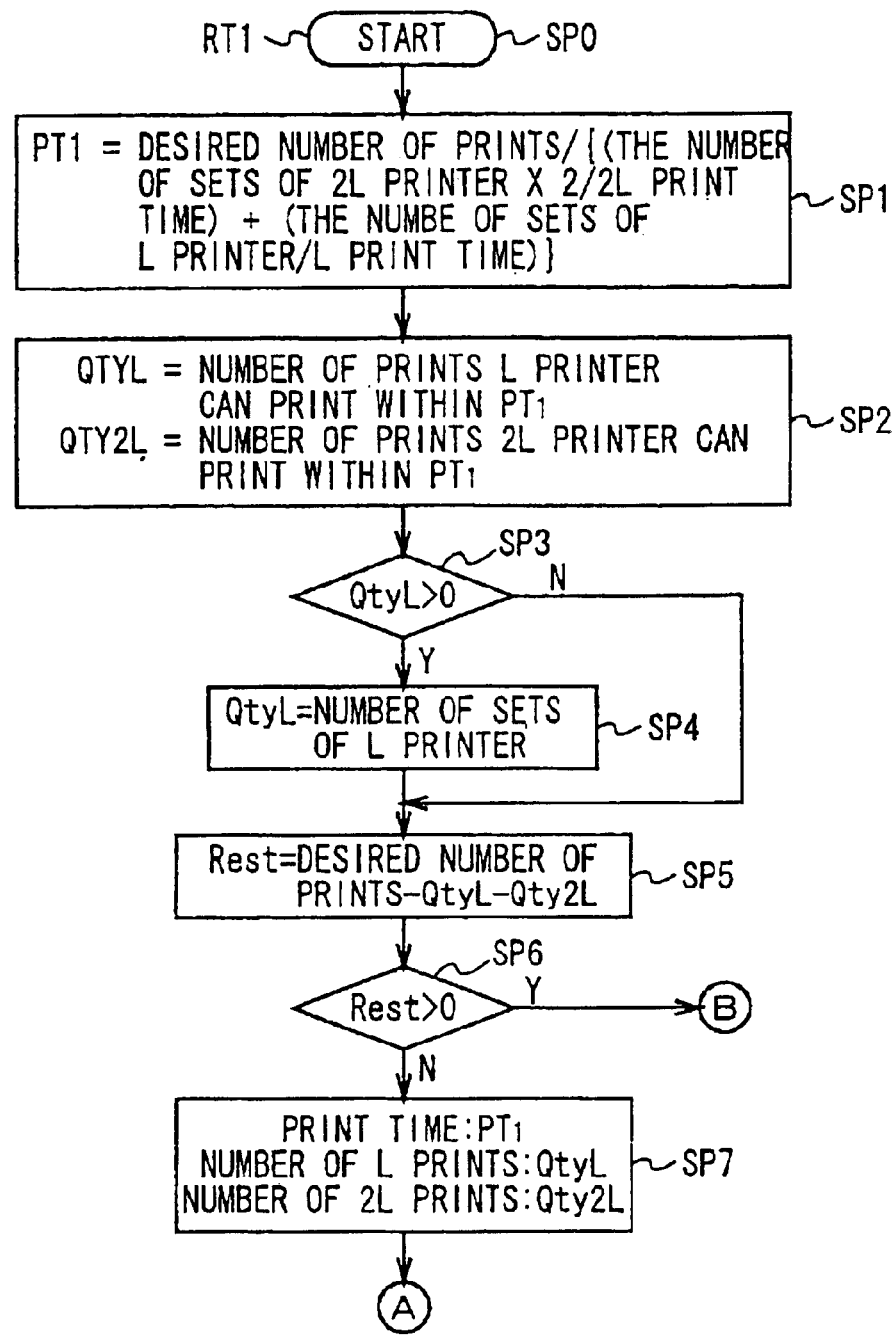
FIG. 15 is a flow chart showing the assignment calculation processing procedure.
Figure 16:
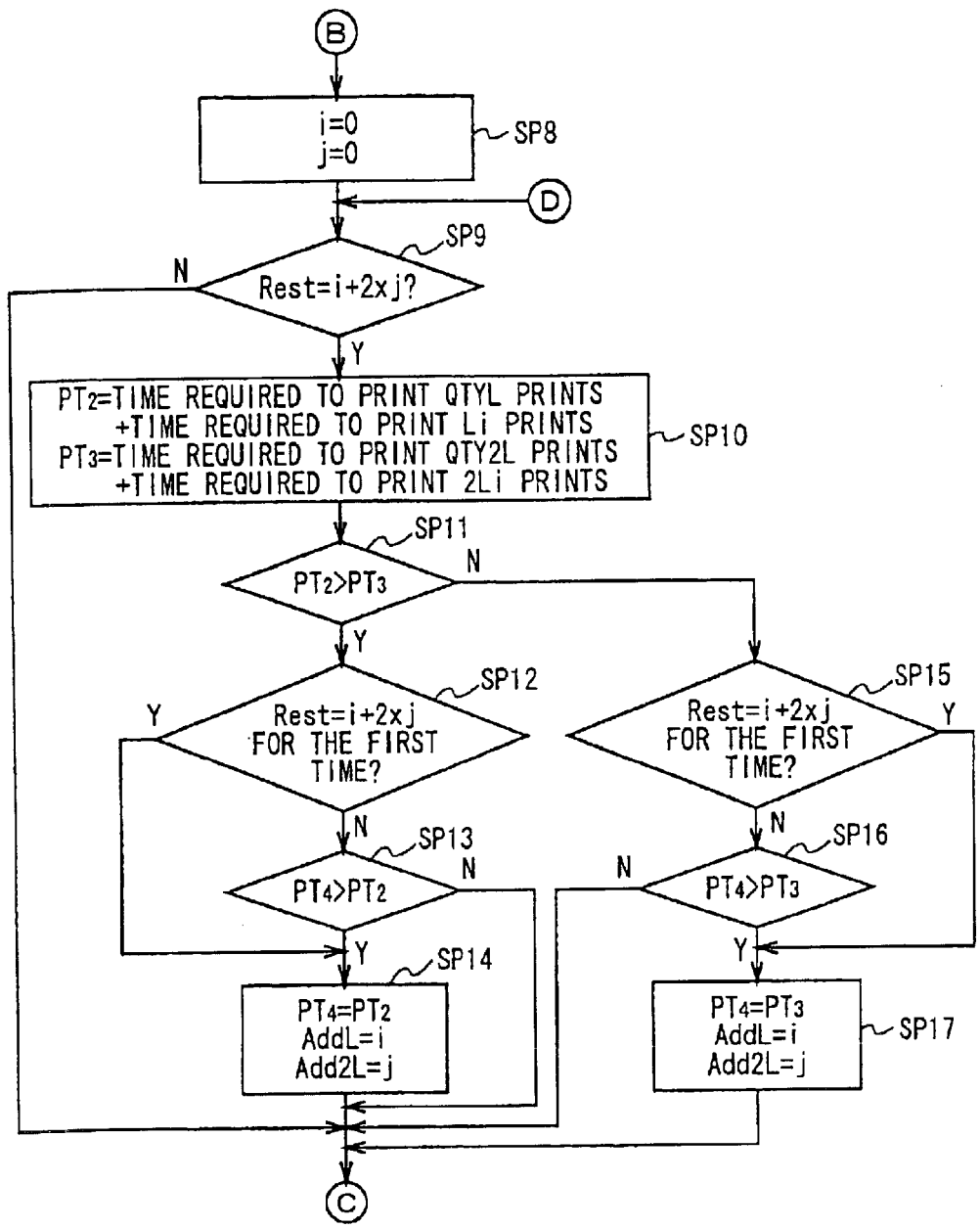
FIG. 16 is a flow chart showing the assignment calculation processing procedure.
Figure 17:
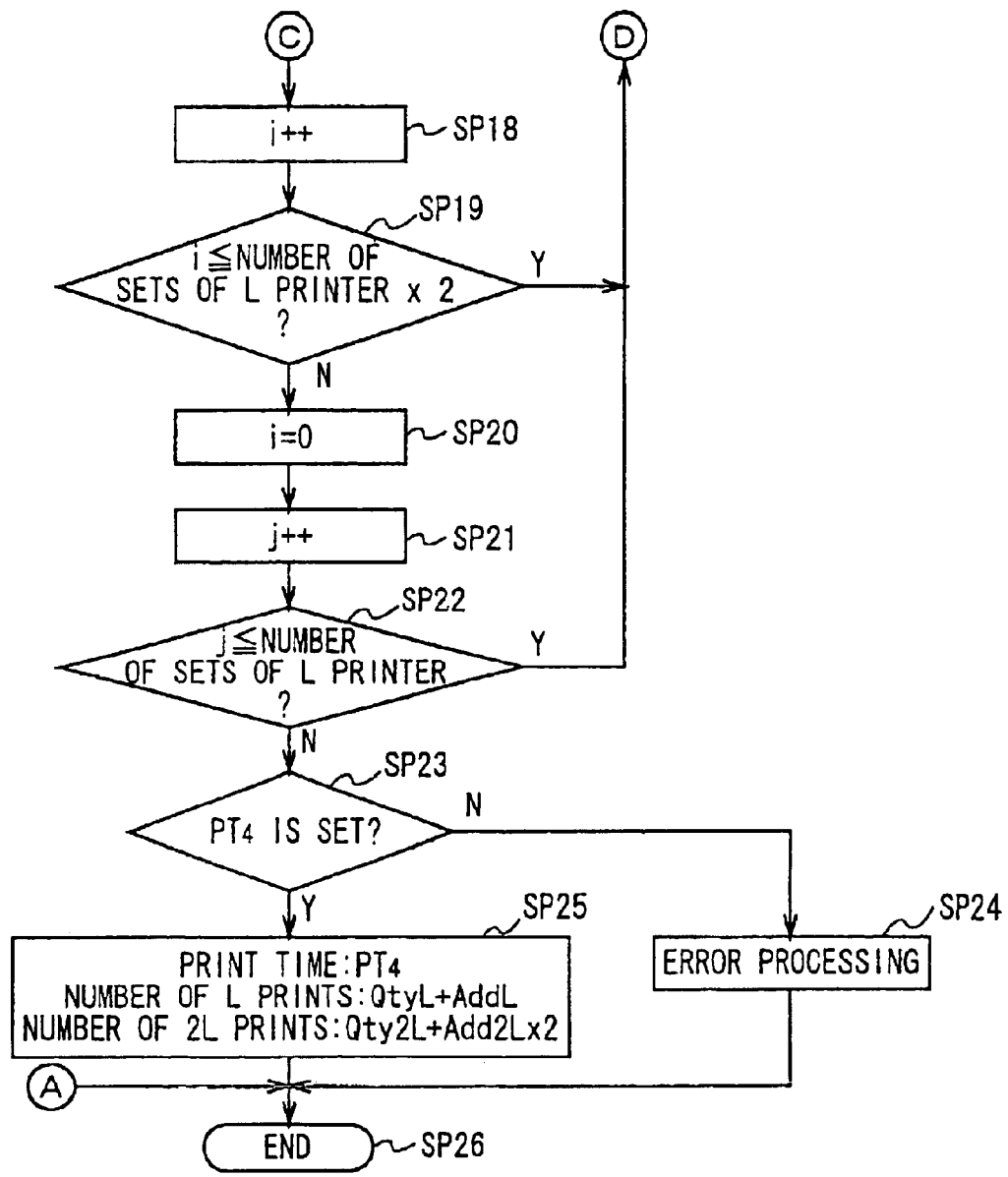
FIG. 17 is a flow chart showing the assignment calculation processing procedure.

In this case, the system control unit 24 determines the number of prints to allocate to the first and the second color roll printers 22 and 23 according to the allocation calculation processing procedure RT1 shown in FIGS. 15 to 17 based on a control program stored in the hard disc device of its own.

More specifically, when the print execution command is entered by the user operation after the selection of each image and the setting of the number of prints to be printed for this image are conducted by the user, the system control unit 24 starts this allocation calculation processing procedure RT1 at the step SP0.

At the following step SP1, the system control unit 24 calculates the following EQUATION:

$$PT_1 = \frac{N}{\frac{P_1}{T_1} + \frac{P_2 \times 2}{T_2}} \tag{2}$$

Where the desired number of prints of the L-size image is N; the number of sets of the first color roll printers 22 (in the case of this embodiment—one) is P$_1$; the print time for one print of the L-size image by the first color roll printer is T$_1$; the number of sets of the second color roll printers 23 (in the case of present embodiment—one) is P$_2$; the print time for 2 prints of the L-size image according to the second print mode by the second color roll printer 23 is T$_2$.

Here, in EQUATION (2), the left side of the denominator shows the number of prints of the L-size image to be printed by the first color roll printer 22 per one second and the right side of the denominator shows the number of prints of the L-size image to be printed by the second color roll printer 23 per one second. Accordingly, from this EQUATION (2), the time required for printing PT$_1$ when printing the desired number of prints N of the L-size image by using the first and the second color roll printers 22 and 23 simultaneously can be obtained.

However, since there is no assurance that this print time PT$_1$ is the common multiple of the print time T$_1$ and print time T$_2$, in practice, the desired number of prints may not be printed within this print time PT$_1$.

At the following step SP2, making the number of prints of the L-size image that can be printed by using all the first color roll printers 22 (hereinafter referred to as the group of the first color roll printer) within the time of the maximum common multiple of the print time T$_1$ and print time T$_2$ under the print time PT$_1$ is QtyL; and, the number of prints of the L-size image that can be printed by using all the second color roll printers 23 (hereinafter referred to as the group of the second color roll printer) is Qty2L; the system control unit 24 obtains these QtyL and Qty2L respectively.

However, since there is the possibility that the desired number of prints N can be printed faster if each first color roll printer 22 stops printing the L-size image once earlier and the second color roll printer 22 prints more copies of these, in the case of this embodiment, the number of printsQtyL is calculated as the number of prints one time before than the number of prints corresponding to the maximum common multiple of the print time T$_1$ and the print time T$_2$ under the print time PT$_1$.

Then, the system control unit 24 proceeds to step SP3 and judges whether the number of prints QtyL is larger than "0" or not, and if an affirmative result is obtained, it proceeds to step SP4. Then, after setting the number of the prints QtyL to the same value of the total number of prints P$_1$ of the first color roll printer 22, the system control unit 24 proceeds to step SP5. On the other hand, if a negative result is obtained, the system control unit 24 proceeds immediately to step SP5.

At step SP5, the system control unit 24 calculates the number of prints remaining Rest, that is, the difference between the desired number of prints N and the number of prints QtyL and the number of prints Qty2L in the following EQUATION:

$$\text{Rest} = N - QtyL - Qty2L \tag{3}$$

Then, the system control unit 24 proceeds to step SP6 and judges whether the value of the number of prints remaining Rest is larger than "0" or not.

Then, when a negative result is obtained at this step SP6, the system control unit 24 proceeds to step SP7 and determines the number of prints of the L-size image to allocate respectively to the first color roll printer group and the second color roll printer group as the number of prints QtyL and Qty2L calculated at step SP2. Then, it proceeds to the step SP26 (FIG. 17) and terminates the allocation calculation processing procedure RT1.

Accordingly, in this case, all of the L-size images specified by the user can be printed out by allocating the L-size image print to the part of the first color roll printer group or all of the first color roll printers 22 one by one and by not using the second color roll printer 23.

On the other hand, when an affirmative result is obtained at step SP6, the system control unit 24 proceeds to step SP8 and sets the value of "i" and "j" to "0" (initialize) in the case where the number of prints of the remaining prints Rest to be allocated to the first color roll printer group is "i" prints, and the number of prints to be allocated to the second color roll printer group is "j" prints. Then, after step SP9, the system control unit 24 searches for the combination of "i"

and "j" in which the number of usage of each first color roll printer 22 of the first color roll printer group is less than twice, the number of usage of each second color roll printer 23 of the second color roll printer group is less than once and the remaining prints Rest can be printed most rapidly, and the second color roll printer 23 is the most used.

More specifically, the system control unit 24 calculates the following EQUATION using the value "i" and "j" set in the step SP9.

$$i + 2 \times j \tag{4}$$

Then, the system control unit 24 judges whether this value agrees with the number of remaining prints Rest or not.

Then, when a negative result is obtained at step SP9, the system control unit 24 proceeds to step SP18 and resets the value of "i" to a value bigger than the value at that time by one. And, the system control unit 24 proceeds to step SP19 and judges whether the value of "i" at that time is smaller than twice the number of sets of the first color roll printer 22 $P_1$ or not.

Then, when an affirmative result is obtained at step SP19, the system control unit 24 returns to step SP9 and repeats the loop of steps SP9–SP18–SP19–SP9 until the affirmative result is obtained at step SP9 or step SP19.

Furthermore, when a negative result is obtained at step SP19, the system control unit 24 proceeds to step SP20, and as well as setting the value of "i" to "0", resets the value of "j" to the value only one bigger than the value at that time. Then, it proceeds to step SP22 and judges whether the value of "j" at that time is smaller than the number of sets of the second color roll printers 22 $P_2$ or not.

Then, when an affirmative result is obtained at this step SP22, the system control unit 24 returns to step SP9. Then, it repeats the loop of steps SP9–SP18–SP22–SP9 until the affirmative result is obtained at step SP9 or step SP22.

When an affirmative result is obtained at step SP9 by detecting the combination of "i" and "j" in which the value of EQUATION (4) agrees with the number of remaining prints Rest, according to the processing described above, the system control unit 24 proceeds to step SP10 and calculates the second and the third print times $PT_2$ and $PT_3$, respectively, making the print time required to print QtyL copies of the L-size image calculated at step SP2 using all the first color roll printers 22 and "i" copies of the L-size image set at that time to be $PT_2$ and the print time required to print Qty2L copies of the L-size image calculated at step SP2 using all the second color roll printers 23 and "j" copies of the L-size image set at that time to be $PT_3$.

Furthermore the system control unit 24 proceeds to step SP11 and judges whether the second print time $PT_2$ is larger than the print time $PT_3$ or not. And, if an affirmative result is obtained, it proceeds to step SP12 and judges whether the value of EQUATION (4) agrees with the number of remaining prints Rest or not.

Then, if an affirmative result is obtained at this step SP12, the system control unit 24, proceeding to the step SP14, memorizes the print time $PT_2$ at that time as the time required to print the desired number of prints of the L-size image (hereinafter referred to as the total print time $PT_4$), and simultaneously memorizes the value of "i" at that time as the number of prints to allocate to the first color roll printer group in the remaining prints (hereinafter referred to as the number of first additional allocation prints AddL). And, also, it memorizes the value of "j" at that time as the number of prints to allocate to the second color roll printer group in the remaining prints Rest (hereinafter referred to as the number of the second additional allocation prints Add2L).

Then, at step SP9, the system control unit 24, by repeating the loop of steps SP9–SP22 until a negative result is obtained, successively finds the other combination of "i" and "j" in which the value of Equation (4) agrees with the number of prints remaining Rest.

Then, every time the system control unit 24 obtains the affirmative result at step SP11, as well as obtaining the other combination, it proceeds to step SP13 from step SP12 and judges whether the print time $PT_2$ at that time is smaller than the total print time $PT_4$ memorized in advance or not. And, if an affirmative result is obtained at this step SP13, the system control unit 24 proceeds to step SP14, and after updating the total print time $PT_4$ and the number of first additional allocation prints AddL and the number of the second additional allocation prints Add2L to the values at that time, it proceeds to step SP18. On the other hand, if a negative result is obtained at step SP13, the system control unit 24 proceeds directly to step SP18 and repeats step SP9–step SP22 until a negative result is obtained.

On the other hand, in the case where a negative result is obtained at step SP11, the system control unit 24 proceeds to step SP15 and judges whether the value of EQUATION (4) agrees with the number of prints remaining Rest or not for the first time.

In the case where the system control unit 24 obtains an affirmative result at step SP15, it proceeds to step SP17, and memorizes the print time $PT_3$ at that time as the time required to print the desired number of prints of the L-size image (total print time $PT_4$). And, simultaneously, it memorizes the value of "i" at that time as the number of prints to allocate to the first color roll printer group (the number of the first additional allocation prints) in the number of prints remaining Rest and the value of "j" at that time as the number of prints to allocate to the second color roll printer group in the number of prints remaining Rest (the number of second additional allocation prints Add2L).

Then, the system control unit 24, repeating the processing of steps SP9–SP22 until a negative result is obtained at step SP9, successively finds the other combination of "i" and "j" in which the value of EQUATION (3) agrees with the number of prints remaining Rest.

Furthermore, every time when the system control unit 24 obtains such other combinations and a negative result at step SP11, it proceeds to step SP16 from step SP15; and, it judges whether the print time $PT_2$ at that time is smaller than the total print time $PT_4$ memorized in advance or not. At step SP16, if an affirmative result is obtained, the system control unit 24 proceeds to step SP17, and after updating the total print time $PT_4$ and the number of the first additional allocation prints AddL and the number of second additional allocation prints Add2L to the values of at that time respectively, the system control unit 24 proceeds to step SP18. On the other hand, if a negative result is obtained at step SP16, the system control unit 24 directly proceeds to step SP18, and it repeats the processing of step SP9–step SP2 until a negative result is obtained at step SP22.

Furthermore, when a negative result is obtained at step SP22, the system control unit 24 proceeds to step SP23 and judges whether the total print time $PT_4$ is set or not.

At this point, obtaining a negative result at step SP23 means that there exists no other combination of "i" and "j" in which the value of EQUATION (4) agrees with the number of prints remaining Rest. And, accordingly, it means that the number of prints remaining Rest cannot be printed by the combination of the first color roll printer group and the second color roll printer group.

Thus, the system control unit 24, after proceeding to step SP24, executes the predetermined error processing, such as displaying this on the monitor 14. Then, it proceeds to step SP26 and terminates the allocation calculation processing procedure RT1.

On the other hand, if an affirmative result is obtained at step SP23, this means that there exists another combination of "i" and "j" in which the value of EQUATION (4) agrees with the number of prints remaining Rest, and the combination that makes the total print time $PT_4$ to the shortest is the combination of "i" and "j" memorized as the number of first additional allocation prints AddL and the number of second additional allocation prints ADD2L.

Thus, at this point, the system control unit 24 proceeds to step SP25 and determines the number of prints of the L-size image to be allocated to the first color roll printer group $AS_L$ by the following EQUATION:

$$AS_L = QtyL + AddL \tag{5}$$

And, simultaneously, the system control unit 24 determines the number of prints of the L-size image to be allocated to the second color roll printer group $AS_{2L}$ by the following EQUATION:

$$AS_{2L} = Qty2L + Add2L \times 2 \tag{6}$$

Then, after proceeding to step SP26, the system control unit 24 terminates this allocation calculation processing procedure RT1.

In this connection, the system control unit 24 drives each first color roll printer 22 of the first color roll printer group and each second color roll printer 23 of the second color roll printer group so that the determined number of prints of the L-size image can be printed by the first and the second color roll printer groups, respectively, based on the number of prints of the L-size images $AS_L$, $AS_{2L}$ thus determined for the first and the second color roll printer groups.

(4) Operation and Effects of the Present Embodiment

According to the foregoing construction, the printing service device 10 allocates the number of prints to be printed to the first and the second color roll printers 22, 23, respectively, corresponding to the total number of prints of the L-size color images. And, these L-size color images are printed simultaneously by the first and the second color roll printers 22 and 23.

Accordingly, in this printing service device 10, the user desired number of prints of the L-size color image can be printed faster than the case of using 2 sets of first color roll printers for the L-size 22. And, also, this device can cope with 2L-size prints, other than L-size prints.

In practice, concerning the case of providing 2 sets of the first color roll printers for the L-size 22 and the case of providing one set each of the first color roll printer for L-size 22 and the second color roll printer for the 2L-size 23, we calculated the total print time $PT_4$ in the case where the total number of prints is 1–50. For example, we calculated the required time that the first color roll printer 22 prints out one copy of the L-size image to be 20 seconds and the time required for the second color roll printer 23 to print out two copies of the L-size image continuously in the second print mode to be 32 seconds, which are the results shown in FIG. 18.

In this FIG. 18, the column of "L, L" shows each total print time $PT_4$ in the case of using 2 sets of first color roll printers, and the column of "L, 2L" shows each total print time $PT_4$ in the case of using one set each of the first and the second color roll printers under the condition the desired number of prints N (the column of "Number of Prints") is 1–50 copies. And, as is clear from this FIG. 18, as the desired number of prints N increases, the total print time in the case of providing one set each of the first and the second color roll printers 22, 23 becomes shorter as compared with the case of providing 2 sets of first color roll printers 22.

Thus, according to this calculation, it is confirmed that preparing the second color roll printer for the 2L-size 23 in the printing service device 10 and assigning a part or all of the prints to the second color roll printer corresponding to the total number of prints of the L-size color image, printing can be conducted faster.

According to the foregoing construction, since the number of prints to be printed is allocated to the first and the second color roll printers 22, 23 corresponding to the total number of prints of the L-size color image, and L-size color images are printed simultaneously by these first and second color roll printers 22 and 23, L-size color images can be printed faster corresponding to the 2L-print size other than the L-size. Thereby, a printing service device capable of conducting the printing service efficiently can be realized.

(5) Other Embodiments

The embodiment described above has dealt with the case of applying the present invention to the printing service device 10 to be placed on the street or in a convenience store and constructed as shown in FIG. 1. However, the present invention is not only limited to this; it also can be applied widely to various other printing systems.

Figure 19:
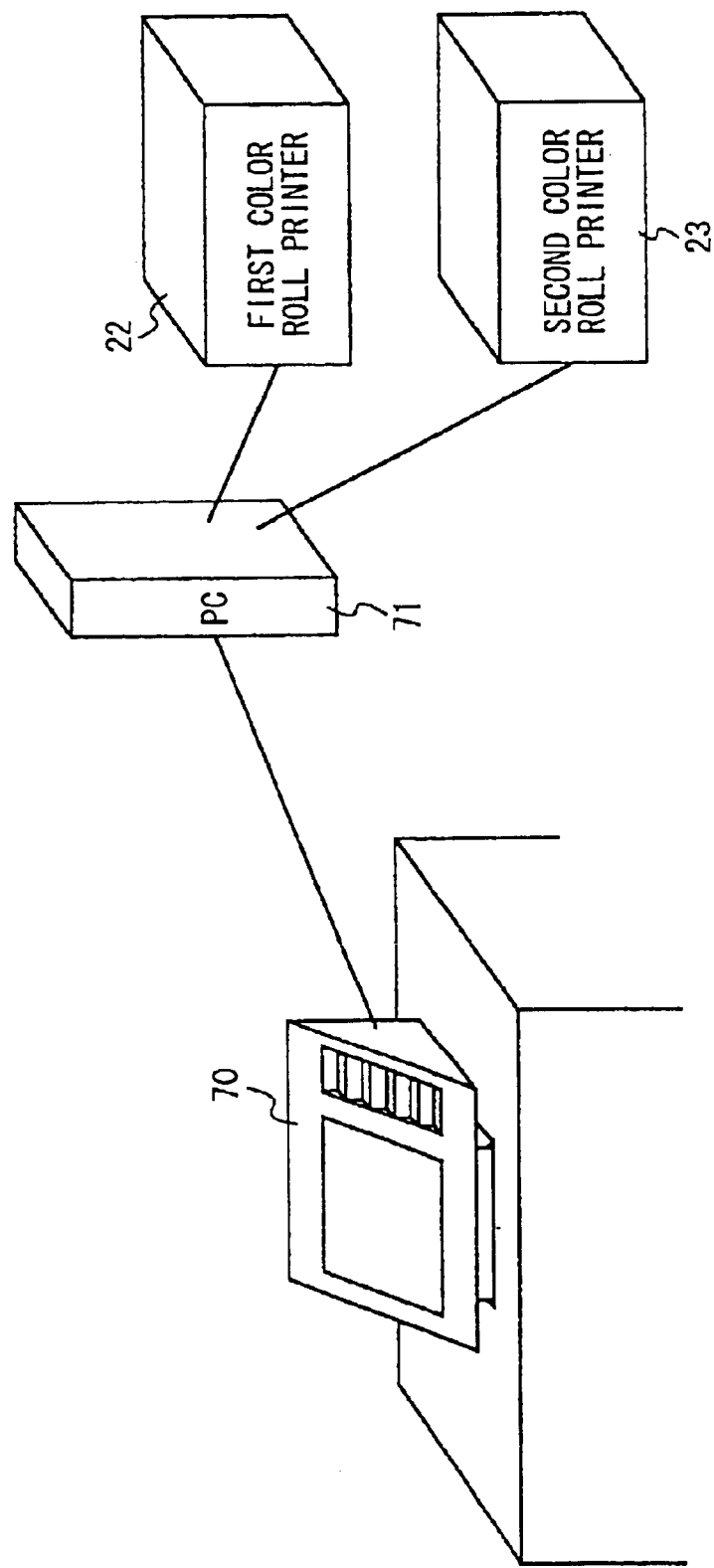
FIG. 19 is a brief linear diagram showing another embodiment.

In this case, as shown in FIG. 19, for example, the printing system may be constituted by a receiver terminal 70 having a function equivalent to the touch panel 13, a monitor 14 and each driver 20 of the printing service 10, a personal computer 71 having a function equivalent to the system control unit 24 of the printing service device 10, and the first and second color roll printers 22 and 23. And, with arrangement, the printing system can be made into a configuration suited for conducting a printing service in a photo shop.

Furthermore, the embodiment described above dealt with the case of forming the printing system by using one set each of the first color roll printer for the L-size 22 and the second color roll printer for the 2L-size 23. However, the present invention is not limited to this; it also can be applied in the case of forming the printing system by using multiple sets each of the first and second color roll printers 22, 23, as in the case described above.

In this case, if more sets of the second color roll printers are provided, printing can be conducted more rapidly. In practice, as shown in FIG. 20, in the case of printing 1 to 50 copies of the L-size images by providing 3 sets of the first and second color roll printers in total, the total print time $PT_4$ is calculated respectively for the case of providing 3 sets of the first color printers 22 (column of "L, L, L"), the case of providing 2 sets of the first color roll printers 22 and one set of second color roll printer 23 (column of "L, L, 2L") and the case of providing one set of the first color roll printer and two sets of the second color printers 23 (column of "L, 2L, 2L"); thus, it can be confirmed that as the number of prints increases, printing can be done more rapidly provided that the number of sets of the second color roll printer 23 is increased.

Furthermore, the embodiment described above dealt with the case of using the 2L-size printer two times as large as the L-size as the second color roll printer 23. However, the present invention is not only limited to this, but also a printer capable of printing a size more than two times larger than the L-size as the second color roll printer 23 and capable of continuously printing more than 2 prints of the L-size image may be applied. In practice, in this case, an ink ribbon and the print media (such as roll paper) fit to its size may be used, and the configuration of the color roll printer itself may be formed corresponding to these.

Furthermore, the embodiment described above dealt with the case of applying ROM as a recording medium to store the program for executing the allocation calculation processing procedure RT1 shown in FIG. 15–FIG. 17. However, the present invention is not only limited to this, but also various types of memories other than ROM, such as disc shaped recording media, for example, CD or hard disc, various kinds of tape shaped recording media, for example, magnetic tape and various other recording media can be widely applied.

Furthermore, the embodiment described above dealt with the case where the system control unit 24 calculates the number of prints to assign to each of the first and the second color roll printers 22, 23 of the first and the second color roll printer group according to the allocation calculation processing procedure RT1. However, the present invention is not limited to this, but also the number of prints to assign to the first and the second color roll printer 22, 23 corresponding to the number of prints of such L size image may be kept as a table in advance.

Furthermore, the embodiment described above dealt with the case of applying the color roll printers 22, 23 as the printing means. However, the present invention is not limited to this, but also various other printing means capable of conducting the printing can be widely applied.

While preferred embodiments have been described in connection with the invention, it will be obvious to those skilled in the art that various changes and modifications may be made, therefore, to cover in the appended claims all such changes and modifications as fall within the true spirit and scope of the invention.

What is claimed is:

1. A printing system comprising:

first printing means for printing images in a first size per one print and discharging these images;

second printing means for printing images in said first size per multiple prints and discharging these images; and control means for determining the number of prints to allocate to each of said first and the second printing means so that the printing is terminated as rapidly as possible corresponding to the total number of prints of said first size to be printed and for controlling said first and the second printing means based on said determination result.

2. A printing system according to claim 1, wherein: said second printing means comprises:

a first print mode for printing images in a second size more than two times larger than said first size and discharging these; and a second print mode for printing images in said first size per multiple prints and cutting off said images per said images and discharging these images; and said control means shifts the print mode of said second printing means to said second print mode as occasion demands based on the total number of prints of said first size to be printed.

* * * * *